(12) United States Patent
Watanabe et al.

(10) Patent No.: US 11,110,934 B2
(45) Date of Patent: Sep. 7, 2021

(54) VEHICLE TRAVEL CONTROL APPARATUS

(71) Applicant: TOYOTA JIDOSHA KABUSHIKI KAISHA, Toyota (JP)

(72) Inventors: Hiroshi Watanabe, Okazaki (JP); Hiroki Yabushita, Toyota (JP); Masato Takagi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/874,130

(22) Filed: May 14, 2020

(65) Prior Publication Data

US 2021/0016783 A1 Jan. 21, 2021

(30) Foreign Application Priority Data

Jul. 16, 2019 (JP) .............................. JP2019-131082

(51) Int. Cl.
*A61B 5/18* (2006.01)
*B60W 40/09* (2012.01)
(Continued)

(52) U.S. Cl.
CPC ............ *B60W 40/09* (2013.01); *B60W 10/18* (2013.01); *B60W 30/12* (2013.01);
(Continued)

(58) Field of Classification Search
CPC ...... B60W 50/14; B60W 40/10; B60W 30/12; B60W 2040/0818; B60W 10/20; B60W 2050/0096; B60W 2540/215; B60W 2540/26; B60W 30/143; B60W 30/16; B60W 30/18109; B60W 30/18145; B60W 40/08; B60W 50/12; B60W 2050/0215; B60W 2050/0292; B60W 2050/143; B60W 2540/229; B60W 2555/00; B60W 2710/20; B60W 2720/106; B60W 30/18163; B60W 30/182; B60W 40/09; B60W 50/02; B60W 50/0205; B60W 50/029; B60W 60/0015; B60W 60/0053; B60W 60/007; G05D 1/0088; G05D 2201/0213; G05D 1/0214; G05D 1/0223; G05D 1/0278; G05D 1/0285; G05D 1/0061; G05D 1/0055;
(Continued)

(56) References Cited

U.S. PATENT DOCUMENTS

2013/0162794 A1* 6/2013 Wakiyama ........... A61B 5/1103
348/77
2014/0345564 A1* 11/2014 Matsunaga ............. F02D 17/04
123/339.1
(Continued)

FOREIGN PATENT DOCUMENTS

JP 2013-152700 A 8/2013
JP 2016-085563 A 5/2016

*Primary Examiner* — Daniel Previl
(74) *Attorney, Agent, or Firm* — Sughrue Mion, PLLC (57) ABSTRACT

Provided is a vehicle travel control apparatus configured to, when a specific scene has not been detected, start deceleration control after a first set time has elapsed since alert processing is started, the vehicle travel control apparatus being further configured to, when the specific scene has been detected, start the deceleration control before the first set time has elapsed since the alert processing is started.

10 Claims, 3 Drawing Sheets

(51) Int. Cl.
*B60W 50/14* (2020.01)
*B60W 30/12* (2020.01)
*B60W 30/18* (2012.01)
*B60W 10/18* (2012.01)
*G06K 9/00* (2006.01)
*B60W 40/08* (2012.01)

(52) U.S. Cl.
CPC ...... *B60W 30/18154* (2013.01); *B60W 50/14* (2013.01); *G06K 9/00798* (2013.01); *G06K 9/00805* (2013.01); *G06K 9/00818* (2013.01); *B60W 2040/0818* (2013.01); *B60W 2050/143* (2013.01); *B60W 2540/26* (2013.01)

(58) Field of Classification Search
CPC .... G05D 1/0212; G05D 1/0257; B60K 35/00; B60K 28/06; B60Q 5/006; B60Q 1/46; G01C 21/005; G01C 21/34; G01C 21/3415; G01C 21/3492; G01C 21/36; G01C 21/3655; G01C 21/3667; G01C 21/367; G01C 21/3691; G01S 19/13; G01S 19/42; G01S 19/47; G01S 19/50; G01S 19/51; G01S /; G06Q 10/047; G06Q 40/08; G07C 5/008; G07C 5/02; G08G 1/0112; G08G 1/012; G08G 1/0125; G08G 1/0133; G08G 1/0141; G08G 1/052; G08G 1/091; G08G 1/093; G08G 1/0965; G08G 1/096725; G08G 1/096783; G08G 1/096827; G08G 1/096844; G08G 1/096855; G08G 1/096883; G08G 1/127; G08G 1/16; G08G 1/162; G08G 1/166; G08G 7/02; G08G 1/167; G08G 1/0962; H04L 65/4076; H04L 67/12; H04L 67/18; H04Q 2209/40; H04Q 9/00; H04W 4/027; H04W 4/06; H04W 4/40; B62D 15/025; B62D 6/08; B60T 7/14; B60Y 2302/05; G06K 9/00845
USPC .... 340/576, 425.5, 438, 571, 575, 582, 588, 340/636.18, 686.6, 691.6, 3.9
See application file for complete search history.

(56) References Cited

U.S. PATENT DOCUMENTS

| | | | |
|---|---|---|---|
| 2016/0075330 A1* | 3/2016 | Oguri | B60T 7/12 701/70 |
| 2017/0232973 A1* | 8/2017 | Otake | B60W 50/14 701/43 |
| 2017/0297566 A1* | 10/2017 | Matsumura | B60K 28/06 |
| 2017/0297567 A1* | 10/2017 | Matsumura | B60W 40/08 |
| 2017/0341575 A1* | 11/2017 | Hauler | B60Q 7/005 |
| 2017/0369044 A1* | 12/2017 | Otake | B60K 28/06 |
| 2018/0015827 A1* | 1/2018 | Takano | B60T 7/22 |
| 2018/0037260 A1* | 2/2018 | Otake | B62D 15/025 |
| 2018/0086346 A1* | 3/2018 | Fujisawa | B62D 15/025 |

* cited by examiner

VEHICLE TRAVEL CONTROL APPARATUS

CROSS-REFERENCES TO RELATED APPLICATION

The present application claims priority to Japanese patent application No. JP 2019-131082 filed on Jul. 16, 2019, the content of which is hereby incorporated by reference in its entirety.

BACKGROUND

1. Technical Field

The present disclosure relates to a vehicle travel control apparatus configured to stop a vehicle (own vehicle) when a driver is thrown into an abnormal state in which the driver loses an ability to drive the own vehicle.

2. Description of the Related Art

Hitherto, there has been proposed a control apparatus for a vehicle configured to determine whether or not a driver of the vehicle is in an abnormal state, and decelerate the vehicle when determining that the driver is in the abnormal state (see Japanese Patent Application Laid-open No. 2016-85563). The abnormal state herein refers to a state in which the driver loses an ability to drive the vehicle. Examples of the abnormal state include a state in which the driver falls asleep while driving the vehicle (drowsy driving state), a state in which mind and body functions of the driver are stopped, and the like.

Hereinafter, the "abnormal state in which the driver loses the ability to drive the vehicle" is simply referred to as "abnormal state". In addition, the determination as to whether the driver is in the abnormal state is simply referred to as "abnormal state determination".

The control apparatus (hereinafter referred to as "related-art apparatus") disclosed in the above-described patent document starts first alert processing in the vehicle when determining that the driver is in the abnormal state. In a case where the driver does not respond accordingly even when a first time period has elapsed since the start of the first alert processing, the related-art apparatus starts second alert processing for an object outside the vehicle. In a case where the driver does not respond accordingly even when a second time period (>the first time period) has elapsed since the start of the second alert processing, the related-art apparatus starts deceleration control as danger avoidance control to thereby stop the vehicle.

As described above, as the predefined time period (at least the second time period in the above example) has elapsed since the abnormal state of the driver has been detected, the related-art apparatus starts the deceleration control. The predefined time period is set in consideration of a time period for which the alert processing for the driver is executed to confirm whether the driver is really in the abnormal state.

SUMMARY

However, in the related-art apparatus, the predefined time period is constant, and no consideration is given to the timing of starting the deceleration control. For example, depending on the situation around the vehicle, there arises a case where it is better to start the deceleration control early without waiting for the elapse of the predefined time period.

The inventors of the present application have obtained the following knowledge that, for example, in a case where there is an intersection in front of the vehicle, the deceleration control may be started earlier so that the vehicle does not pass through the intersection while the driver is in the abnormal state.

The present disclosure provides a technique capable of starting the deceleration control at an appropriate timing as compared with the related-art apparatus.

In one or more embodiments, there is provided a vehicle travel control apparatus for a vehicle. The vehicle travel control apparatus includes: an abnormal state determination module configured to repeatedly determine whether or not a driver of the vehicle is in an abnormal state in which the driver loses an ability to drive the vehicle; a driver alert module configured to, when determining that the driver is in the abnormal state, start alert processing for the driver; a first travel stop module configured to, when determining that the abnormal state is not resolved at a time point at which a first set time has elapsed since the start of the alert processing, start deceleration control to stop the vehicle; a specific scene determination module configured to acquire peripheral information of the vehicle in a situation in which the abnormal state is not resolved, and determine whether or not a travel scene of the vehicle is a predetermined specific scene based on the peripheral information; and a second travel stop module configured to, when determining that the travel scene of the vehicle is the specific scene, start the deceleration control before the first set time has elapsed since the start of the alert processing to stop the vehicle.

In the above configuration, the abnormal state determination module repeatedly determines whether or not the driver of the vehicle (own vehicle) is in the abnormal state in which the driver loses the ability to drive the vehicle. This abnormal state determination can be performed by one or more of various methods as described later. Examples of the methods includes (i) determining whether a non-driving operation state has continued for a predetermined time threshold (abnormal determination time) or longer, and (ii) determining whether a state in which the driver does not press a confirmation button has continued for a predetermined time threshold or longer after the pressing operation of the confirmation button is requested. The non-driving operation state refers to a state in which the driver does not perform an operation for driving the vehicle. In one or more embodiments, the abnormal state determination may be performed by using a so-called "driver monitor technology" disclosed in Japanese Patent Application Laid-Open No. 2013-152700.

The driver alert module starts the alert processing for the driver when determining that the driver is in the abnormal state. It can be considered that, when the driver responds in response to this alert processing, the driver is not in the abnormal state. Therefore, the alert processing not only alerts the driver, but also functions as a method for confirming that the driver is in the abnormal state.

The first travel stop module starts the deceleration control to stop the vehicle when determining that the abnormal state is not resolved at the time point at which the first set time has elapsed since the start of the alert processing. When the driver responds before the first set time has elapsed since the start of the alert processing, it is estimated that the abnormal state is resolved. In this case, the deceleration control is not performed. On the other hand, when the driver is still in the abnormal state (that is, there is no response by the driver) at the time point at which the first set time has elapsed since the start of the alert processing, the first travel stop module starts the deceleration control to stop the vehicle.

The specific scene determination module acquires the peripheral information of the vehicle in the situation in which the abnormal state is not resolved. Further, the specific scene determination module determines whether or not the travel scene of the vehicle is the predetermined specific scene based on the peripheral information. In one or more embodiments, the specific scene may be a travel scene of the vehicle considered to be better to stop the vehicle early.

The second travel stop module starts, when determining that the travel scene of the vehicle is the specific scene, the deceleration control even before the first set time has elapsed since the start of the alert processing to thereby stop the vehicle. Therefore, the vehicle travel control apparatus can start the deceleration control at an appropriate timing in accordance with the peripheral information of the vehicle.

In one or more embodiments, the second travel stop module is configured to, when determining that the travel scene of the vehicle is the specific scene after a second set time has elapsed since the start of the alert processing, start the deceleration control to stop the vehicle. The second set time is longer than zero and shorter than the first set time.

When it is determined that the travel scene of the vehicle is the specific scene after the second set time has elapsed since the start of the alert processing, the deceleration control is started to stop the vehicle. The second set time is longer than zero and shorter than the first set time. The second set time can be ensured as a time period for confirming, through the alerting processing, that the driver is in the abnormal state.

In one or more embodiments, the vehicle travel control apparatus further includes a peripheral warning module configured to, when determining that the driver is in the abnormal state, start warning processing for a peripheral object of the vehicle before the deceleration control is started. The second travel stop module is configured to, at the start of the deceleration control, increase a braking force more slowly than the first travel stop module.

In this configuration, the peripheral warning module starts the warning processing for the peripheral object of the vehicle before the deceleration control is started when determining that the driver is in the abnormal state. Therefore, it is possible to alert the peripheral object such as a driver of another vehicle or a pedestrian present in a surrounding area of the vehicle. In a case where the deceleration control is started at an early timing, the period from the start of the warning processing for the peripheral object to the start of the deceleration control is short. For example, a driver of a following other vehicle cannot afford to perform an avoidance operation for preventing the following other vehicle from colliding with the own vehicle, and therefore, there is a possibility that the following other vehicle may suddenly approach the own vehicle.

In view of the above, the second travel stop module increases the braking force more slowly than the first travel stop module at the start of the deceleration control. Therefore, the driver of the following other vehicle can afford to perform the avoidance operation. As a result, it is possible to prevent the following vehicle from suddenly approaching the own vehicle.

In one or more embodiments, the specific scene includes a scene in which white lines defining a lane in which the vehicle travels cannot be recognized, or a scene in which the vehicle deviates from the lane.

In one or more embodiments, the vehicle travel control apparatus further includes a lane departure prevention control system for preventing the vehicle from deviating from the lane. The specific scene determination module is further configured to acquire lane deviation information or white line recognition information from the lane departure prevention control system, and determine whether or not the travel scene of the vehicle is the specific scene. The lane deviation information is information on whether the vehicle deviates from the lane, and the white line recognition information is information on whether the white lines can be recognized.

In a situation in which the vehicle deviates from the lane, the vehicle may be stopped earlier. In addition, in a situation in which the white lines defining the lane in which the vehicle travels cannot be recognized, appropriate lane departure prevention control cannot be performed in the lane departure prevention control system. In such a situation, the vehicle may be stopped earlier. In view of this, the specific scene includes the scene in which the white lines defining the lane in which the vehicle travels cannot be recognized, or the scene in which the vehicle deviates from the lane. Therefore, in the above-mentioned scene, the deceleration control is started before the first set time has elapsed since the start of the alert processing to thereby stop the vehicle.

In one or more embodiments, the specific scene includes a scene in which a stop point has been detected. The stop point is a point on a travel path along which the vehicle is to travel, and at which the vehicle should be stopped.

In one or more embodiments, the stop point includes at least one of: an intersection on the travel path along which the vehicle is to travel, a junction with another lane on the travel path along which the vehicle is to travel, or a railroad crossing on the travel path along which the vehicle is to travel.

In one or more embodiments, the vehicle travel control apparatus further includes a road sign assist system for recognizing a road sign installed in front of the vehicle, and assisting a driving operation of the driver by using information on the recognized road sign. The specific scene determination module is further configured to acquire information on the road sign from the road sign assist system, and determine whether or not the travel scene of the vehicle is the specific scene.

In one or more embodiments, the vehicle travel control apparatus further includes a navigation system. The specific scene determination module is further configured to acquire information on the stop point from the navigation system, and determine whether or not the travel scene of the vehicle is the specific scene.

In a case where there has been detected the stop point (an intersection, a junction with another lane, or a railroad crossing) on the travel path along which the vehicle is to travel and at which the vehicle should be stopped, the vehicle travel control apparatus may allow the vehicle not to path through the stop point while the driver is in the abnormal state. In the above-mentioned configuration, the specific scene includes a scene in which there has been detected the stop point on the travel path along which the vehicle is to travel, and at which the vehicle should be stopped. Therefore, it is possible to prevent the vehicle from passing through the stop point in the situation the driver is in the abnormal state.

In one or more embodiments, the specific scene includes a scene in which a preceding vehicle has been detected ahead of the vehicle, or a scene in which an obstacle has been detected ahead of the vehicle.

In a scene in which a preceding vehicle has been detected ahead of the vehicle, or a scene in which an obstacle has been detected ahead of the vehicle, the vehicle travel control apparatus may allow the vehicle not to travel while the driver is in the abnormal state. That is, the vehicle may be stopped. In the above-mentioned configuration, the specific scene includes a scene in which a preceding vehicle has been detected ahead of the vehicle, or a scene in which an obstacle has been detected ahead of the vehicle. Therefore, in the above-mentioned scene, the deceleration control is started before the first set time has elapsed since the start of the alert processing to thereby stop the vehicle.

According to one or more embodiments, one or more of the above-mentioned modules may be implemented by a microprocessor programmed for performing one or more operations and/or functionality described herein. In addition, one or more of the above-mentioned modules may be implemented, in whole or in part, by specifically configured to hardware (e.g., by one or more application specific integrated circuits or ASIC(s)).

DESCRIPTION OF THE EMBODIMENTS

A vehicle travel control apparatus according to at least one embodiment of the present disclosure will be described with reference to the figures. Hereinafter, the vehicle travel control apparatus is simply referred to as "control apparatus".

Figure 1:
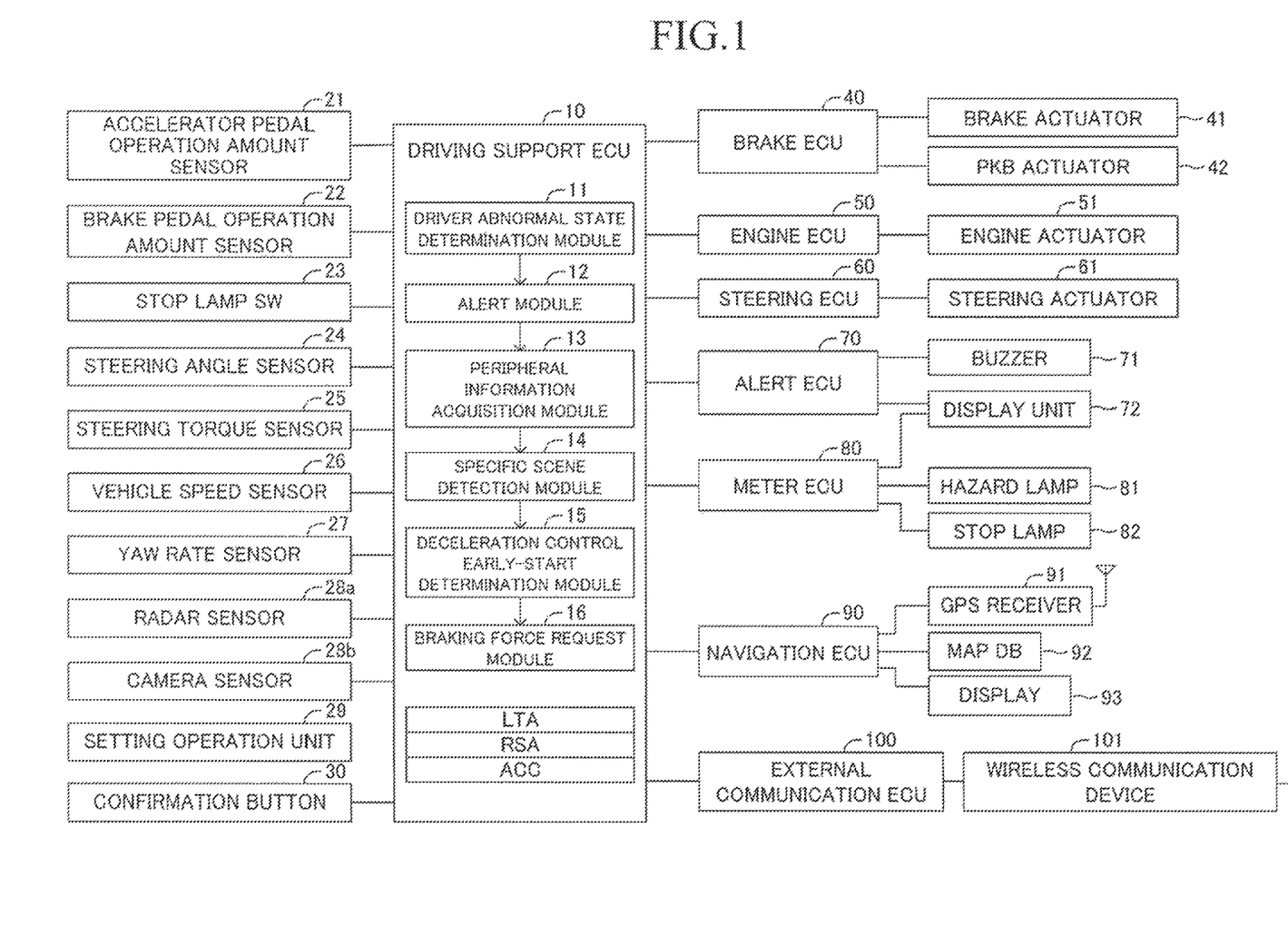
FIG. 1 is a schematic configuration diagram of a vehicle travel control apparatus according to at least one embodiment.

The control apparatus is applied to a vehicle. In the following, a vehicle equipped with the control apparatus may be referred to as "own vehicle" in order to distinguish the vehicle from other vehicles. As illustrated in FIG. 1, the control apparatus includes a driving support ECU 10, a brake ECU 40, an engine ECU 50, a steering ECU 60, an alert ECU 70, a meter ECU 80, a navigation ECU 90, and an external communication ECU 100.

Each of those ECUs is an electric control unit including a microcomputer as a main component. The ECUs are connected to each other such that information can be transmitted and received to and from each other via a controller area network (CAN) (not shown). The microcomputer herein includes a CPU, a ROM, a RAM, a non-volatile memory, an interface I/F, and the like. The CPU executes instructions (programs and routines) stored in the ROM to realize various functions. In addition, some or the whole of the above-mentioned ECUs may be integrated into one ECU.

The driving support ECU 10 is electrically connected to elements (including sensors and operating switches/buttons) listed below, and is configured to receive detection signals or output signals from those elements. The elements may be electrically connected to any of the ECUs other than the driving support ECU 10. In this case, the driving support ECU 10 receives the detection signals or the output signals of the elements from the ECUs connected to the elements via the CAN.

An accelerator pedal operation amount sensor 21 is configured to detect an operation amount (accelerator opening degree) of an accelerator pedal of the vehicle, and output a signal indicative of the accelerator pedal operation amount to the driving support ECU 10. A brake pedal operation amount sensor 22 is configured to detect an operation amount of a brake pedal of the vehicle, and output a signal indicative of the brake pedal operation amount to the driving support ECU 10. A stop lamp switch 23 is configured to output a low-level signal to the driving support ECU 10 when a driver does not depress (operate) the brake pedal, and output a high-level signal to the driving support ECU 10 when the driver depresses (operates) the brake pedal.

A steering angle sensor 24 is configured to detect a steering angle of the vehicle, and output a signal indicative of the steering angle to the driving support ECU 10. A steering torque sensor 25 is configured to detect a steering torque applied to a steering shaft of the vehicle by an operation of a steeling wheel, and output a signal indicative of the steeling torque to the driving support ECU 10. A vehicle speed sensor 26 is configured to detect a traveling speed (vehicle speed) of the vehicle, and output a signal indicative of the vehicle speed to the driving support ECU 10. A yaw rate sensor 27 is configured to detect a yaw rate of the vehicle, and output a signal indicative of the yaw rate to the driving support ECU 10.

A radar sensor 28a is configured to acquire information on a road ahead of the vehicle and information on three-dimensional objects being present on the road. The three-dimensional objects include, for example, moving objects such as pedestrians, bicycles, vehicles and the like, and motionless objects such as power poles, trees, guardrails and the like. Hereinafter, the three-dimensional object is simply referred to as "object".

The radar sensor 28a includes a radar transceiver (radar transmitting/receiving part) (not shown) and a signal processor (not shown). The radar transceiver radiates a radio wave in a millimeter waveband (hereinafter referred to as "millimeter wave") to a peripheral region of the vehicle including a front region of the vehicle, and receives a millimeter wave (that is, reflected wave) reflected by an object present within a radiation range. Each time a predetermined time elapses, the signal processor acquires object information based on, for example, a phase difference between the transmitted millimeter wave and the received reflected wave, an attenuation level of the reflected wave, and a time period required from the transmission of the millimeter wave to the reception of the reflected wave. The object information includes, for example, a longitudinal distance between the vehicle and the object (that is, inter-vehicle distance), a relative speed between the vehicle and the object, and a lateral distance between the vehicle and the object, a relative lateral speed between the vehicle and the object, and the like.

A camera sensor 28b includes a camera (e.g., stereo camera) (not shown) and an image processor (not shown). The camera takes an image (camera image) on the peripheral region of the vehicle (e.g., landscape in front of the vehicle). The image processor executes image processing on the camera image taken by the camera. The image processor executes the image processing to calculate and acquire object information. This object information includes information on the presence or absence of an object on the camera image, a relative position of the object with respect to the vehicle, and a type of the object. The type of the object is determined, for example, through machine learning.

The camera sensor 28b recognizes right and left lane markings such as white lines of the road (that is, lane markings which define a lane in which the vehicle is traveling). In following, the lane marking is simply referred to as "white line". Based on the recognized white lines, the camera sensor 28b acquires information on the shape of the road (e.g., a radius of curvature representing the degree of road bend), a positional relationship between the road and the vehicle, and the like.

Further, the camera sensor 28b recognizes and identifies a road sign in the camera image through machine learning such as pattern matching.

The driving support ECU 10 synthesizes the object information acquired by the radar sensor 28a and the object information acquired by the camera sensor 28b to thereby determine/recognize a relative relationship between the vehicle and the object, the type of the object and the positional relationship between the vehicle and the road (that is, each white line).

A setting operation unit 29 includes an operation switch to be operated by the driver when the driver selects whether or not to activate various driving support systems implemented/provided in the driving support ECU 10. The setting operation unit 29 is configured to output an operation signal for activating or deactivating each of the driving support systems to the driving support ECU 10.

A confirmation button 30 is arranged at a position at which the driver can operate. The confirmation button 30 is configured to output a low-level signal when the driver does not operate the confirmation button 30, and output a high-level signal when the driver operates (pushes) the confirmation button 30.

The driving support ECU 10 is a central controller for performing driving support for the driver, and includes a plurality of modules capable of executing systems (that is, "driving support systems") for performing various driving supports. The functions of the driving support ECU 10 will be described later.

The brake ECU 40 is connected to a brake actuator 41 and a parking brake actuator 42. The brake actuator 41 adjusts a hydraulic pressure to be supplied to a friction braking mechanism in accordance with a command from the brake ECU 40. With the adjusted hydraulic pressure, a brake pad is pressed against a brake disc to thereby generate a desired friction braking force. In this manner, the brake ECU 40 controls the brake actuator 41 to thereby control a braking force of the vehicle.

The parking brake actuator 42 is an electric actuator for pressing the brake pad against the brake disc. The brake ECU 40 controls the parking brake actuator 42 to apply a parking brake force to wheels to thereby maintain the vehicle in a stopped state.

The engine ECU 50 is connected to an engine actuator 51. The engine actuator 51 is an actuator configured to change an operation state of an engine, and includes a throttle valve actuator for changing an opening degree of a throttle valve of the engine, for example. The engine ECU 50 controls the engine actuator 51 to control a driving force of the vehicle to thereby change an acceleration or an acceleration state.

The steering ECU 60 is a controller for an electric power steering system, and is connected to a steering actuator 61. The steering actuator 61 includes an electric motor assembled in a steering mechanism. The steering actuator 61 generates a torque by an electric power supplied from the steering ECU 60 to thereby apply a steering assist torque to the steering shaft or steer right and left steered wheels.

The alert ECU 70 is connected to a buzzer 71 and a display unit 72. The alert ECU 70 causes the buzzer 71 to utter a sound to alert the driver in accordance with a command from the driving support ECU 10. Further, the alert ECU 70 displays a mark (e.g., warning lamp) for alerting the driver, an alert message and operation states of the driving support systems on the display unit 72 in accordance with a command from the driving support ECU 10.

The meter ECU 80 is connected to the display unit 72, a hazard lamp 81, and a stop lamp 82. The meter ECU 80 can display information on the driving support systems on the display unit 72 in accordance with a command from the driving support ECU 10. The meter ECU 80 turns on (flashes) the hazard lamp 81 in accordance with a command from the driving support ECU 10, and turns on the stop lamp 82 in accordance with a command from the driving support ECU 10. It should be noted that lighting instructions (or flash instructions) to the hazard lamp 81 and the stop lamp 82 do not have to be performed by the meter ECU 80, but instead may be performed by a body ECU (not shown), for example.

The navigation ECU 90 is connected to a GPS receiver 91 for receiving a GPS signal for detecting the current position of the vehicle, a map database 92 storing map information, and a touch-panel type display 93 which is a human machine interface. The navigation ECU 90 identifies/detects the current position of the vehicle based on the GPS signal. The navigation ECU 90 performs various arithmetic processing based on the current position of the vehicle, the map information stored in the map database 92, and the like to thereby perform route guidance on the display 93.

The map information stored in the map database 92 includes road information. The road information includes parameters representing the shape of each section of the road. The parameters include a radius of curvature and a curvature which indicate the degree of how the road bends. The map information further includes point information. The point information includes intersection information on intersections, junction information on road junctions, and railroad crossing information on railroad crossings. The point information includes at least information on positions of those points (intersections, junctions and, railroad crossings).

Therefore, the navigation ECU 90 can recognize, based on the current position of the vehicle and the map information, the presence or absence of the above-mentioned point (an intersection, a junction, or a railroad crossing) present on a travel path along which the vehicle is to travel.

As described above, the navigation ECU 90, the GPS receiver 91, the map database 92 and the display 93 constitute a navigation system.

The map database 92 need not be installed in the vehicle, and may be provided in a service center outside the vehicle, for example. The navigation ECU 90 may acquire the map information from the service center through wireless communication.

The external communication ECU 100 is connected to a wireless communication device 101. The external communication ECU 100 and the wireless communication device 101 constitute a wireless communication terminal for communicating with a help network center (help network system). The external communication ECU 100 drives the wireless communication device 101 in response to a help network connection command from the driving support ECU 10 to communicate with the help network center. The external communication ECU 100 transmits to the help network center a help signal including information on the current position of the vehicle (acquired by the navigation ECU 90) and an ID number identifying the vehicle.

<Driving Support System>

Next, the processing of the driving support ECU 10 will be described. Hereinafter, the driving support ECU 10 is simply referred to as "ECU 10". The ECU 10 is programmed/configured to perform various driving support systems for supporting/assisting several driving operations of the driver (including a steering wheel operation, a pedal operation, and the like). One of those driving support systems is a driver abnormal state support system. In the driver abnormal state support system, the ECU 10 determines whether or not the driver is in the abnormal state in which the driver loses the ability to drive the vehicle, and decelerates the vehicle to stop the vehicle when determining that the driver is in the abnormal state.

Further, the ECU 10 is programmed/configured to perform the following driving support systems in addition to the driver abnormal state support system.

(i) Lane Departure Alert System (hereinafter referred to as "LDA system").

(ii) Lane Tracing Assist System (hereinafter referred to as "LTA system").

(iii) Adaptive Cruise Control System (hereinafter referred to as "ACC system").

(iv) Road Sign Assist System (hereinafter referred to as "RSA system").

Those driving support systems need not be installed in the ECU 10 in which the driver abnormal state support system is installed, and may be provided in other ECUs. In this case, the ECUs provided with the respective driving support systems may be connected such that information can be transmitted and received to and from each other.

In the LDA system, the ECU 10 recognizes a relationship between the vehicle and the white lines based on the information on the peripheral region output from the camera sensor 28b. When there is a possibility that the vehicle deviates from the lane, the ECU 10 causes the buzzer 71 to utter a sound, and alerts the driver on the display unit 72. Further, the ECU 10 controls the steering of the steered wheels such that the vehicle does not deviate from the lane. In this manner, a part of the steering wheel operation by the driver is supported. Such support control is also referred to as "lane departure prevention control". The LDA system may be referred to as "lane departure prevention control system".

In the LTA system, the ECU 10 controls the steering of the steered wheels such that the vehicle travels along a center position of the lane during execution of the ACC system. In this manner, a part of the steering wheel operation by the driver is supported. Such support control is also referred to as "lane keeping support control".

The LTA system does not eliminate the need for the driver to perform the steering operation. Therefore, it is required that the driver holds the steering wheel during the LTA system.

In the ACC system, when the driver selects a constant speed control mode on the setting operation unit 29, the ECU 10 allows the vehicle to travel at a constant speed (vehicle speed set on the setting operation unit 29). When the driver selects a following travel control mode on the setting operation unit 29, the ECU 10 allows the own vehicle to follow a preceding vehicle. In this manner, the driving operation (pedal operation in this system) by the driver is supported.

When the ACC system is in operation and the following travel control mode is selected, the ECU 10 determines, based on the information on the peripheral region output from the radar sensor 28a and the camera sensor 28b, whether or not there is at least one other vehicle in front of the own vehicle and in the lane in which the own vehicle is traveling. When determining that there is at least one other vehicle in front of the own vehicle, the ECU 10 selects the other vehicle closest to the own vehicle from among those other vehicles as a target preceding vehicle for the ACC system. The ECU 10 calculates a target acceleration for allowing the own vehicle to follow the preceding vehicle while maintaining a distance between the own vehicle and the preceding vehicle at a predetermined inter-vehicle distance. When determining that there is no other vehicle in front of the own vehicle, the ECU 10 calculates a target acceleration for allowing the vehicle to travel at a constant speed (vehicle speed set on the setting operation unit 29) in the same manner as the constant speed control mode.

The ECU 10 calculates a required driving force for accelerating the vehicle in accordance with the target acceleration (or decelerating the vehicle when the target acceleration is a negative value). The ECU 10 transmits a driving command indicative of the required driving force to the engine ECU 50. Therefore, the driving force is controlled so as to accelerate (or decelerate) the vehicle in accordance with the target acceleration.

In the RSA system, the ECU 10 recognizes a road sign installed in front of the vehicle, and notifies the driver of information on the recognized road sign. As the camera sensor 28b detects a road sign installed in front of the vehicle, the camera sensor 28b transmits information on the road sign (hereinafter referred to as "road sign information") to the ECU 10. In a case where the RSA system is in operation, the ECU 10 transmits a sign information display command to the meter ECU 80 based on the road sign information output from the camera sensor 28b. The sign information display command includes the road sign information. The meter ECU 80 displays the content included in the road sign information on the display unit 72 in accordance with the sign information display command. Therefore, the driver can easily recognize road restrictions and road conditions at the present time.

<Driver Abnormal State Support System>

Next, the driver abnormal state support system implemented in the ECU 10 will be described. In the driver abnormal state support system, the ECU 10 determines whether or not the driver is in the abnormal state in which the driver loses the ability to drive the vehicle. When the ECU 10 determines that the driver is in the abnormal state, the ECU 10 executes alert processing for the driver. When a response from the driver has not been detected even after a lapse of a set time from the start of the alert processing, the ECU 10 starts deceleration control to stop the vehicle.

Further, in the driver abnormal state support system according to one or more embodiments, when the ECU 10 determines that the driver is in the abnormal state, the ECU 10 detects a peripheral condition of the vehicle. When the current scene of the vehicle is a scene in which the vehicle should be stopped early (hereinafter referred to as "specific scene"), the ECU 10 starts the deceleration control early without waiting for the elapse of the set time from the start of the alert processing.

As illustrated in FIG. 1, the driving support ECU 10 includes, as functional modules constituting the driver abnormal state support system, a driver abnormal state determination module 11, an alert module 12, a peripheral information acquisition module 13, a specific scene detection module 14, an deceleration control early-start determination module 15, and a braking force request module 16.

In one or more embodiments, the ECU 10 can perform/execute the driver abnormal state support system in a situation in which the ACC system is in operation.

The driver abnormal state determination module 11 repeatedly determines whether or not the driver is in the abnormal state in which the driver loses the ability to drive the vehicle while the vehicle is traveling. In this configuration, the driver abnormal state determination module 11 determines whether the driver is in a state in which the driver does not perform the driving operation. Hereinafter, such a state is referred to as "non-driving operation state". The non-driving operation state refers to a state in which none of parameters described below is changed. The parameters include one or more of "the accelerator pedal operation amount, the brake pedal operation amount, the steering torque, and the signal level of the stop lamp switch 23" which are changed depending on the driving operation of the driver. For example, the ECU 10 considers, as the non-driving operation state, a state in which none of "the accelerator pedal operation amount, the brake pedal operation amount, and the steering torque" is changed and the steering torque is maintained at "0". The determination of the steering wheel operation relating to the non-driving operation state need not be based on the steering torque. For example, a touch sensor (not shown) may be provided on the steering wheel, and the determination may be made based on a detection signal of the touch sensor.

The driver abnormal state determination module 11 determines that the driver is in the abnormal state when the non-driving operation state continues for a predetermined abnormal determination time or longer.

The alert module 12 outputs an alert command for the non-driving operation state to the alert ECU 70 when the driver abnormal state determination module 11 determines that the driver is in the abnormal state. Thus, the alert ECU 70 executes the alert processing. Specifically, the alert ECU 70 causes the buzzer 71 to utter an alert sound. In addition, the alert ECU 70 flashes a warning lamp on the display unit 72, and displays an alert message prompting the driving operation on the display unit 72. If the driver is not in the abnormal state, the driver should make a response operation in response to the alert processing, and that response operation is detected by the ECU 10.

The peripheral information acquisition module 13 acquires peripheral information of the vehicle when the driver abnormal state determination module 11 determines that the driver is in the abnormal state (that is, the alert module 12 starts the alert processing for the driver). The peripheral information includes the following pieces of information.

Information 1: lane deviation information, and white line recognition information;

Information 2: information on a stop point at which the vehicle is likely to stop. The stop point includes an intersection, a junction, a railroad crossing, and the like; and Information 3: information on a preceding vehicle, and information on an obstacle.

Regarding the information 1, the lane deviation information is information as to whether or not the vehicle deviates from the lane. The white line recognition information is information as to whether or not white lines defining the lane in which the vehicle travels can be recognized. In the LDA system, the ECU 10 recognizes white lines on left and right sides of the lane of the vehicle, and performs the lane departure prevention control based on a relative positional relationship between the white lines and the vehicle. For this reason, in the LDA system, the ECU 10 determines a departure level of the vehicle with respect to the lane, and a recognition status of the white lines. Therefore, the peripheral information acquisition module 13 acquires the lane departure information and the white line recognition information through the LDA system.

The information 2 is information as to whether there is a stop point on a travel path along which the vehicle is to travel. The stop point is a point at which the vehicle should be stopped. Examples of the stop point include an intersection, a junction, a railroad crossing, and the like.

The peripheral information acquisition module 13 can estimate the stop point from a road sign recognized by the RSA system. Examples of the road sign include a road sign indicating an intersection, a road sign indicating a traffic light, a road sign indicating a stop sign, a road sign indicating a railroad crossing, and the like. The peripheral information acquisition module 13 uses those road signs to estimate the stop point.

Further, the peripheral information acquisition module 13 can estimate the stop point by using the navigation system in place of the RSA system. The navigation system includes the map database 92. The map database 92 includes the road information. As described above, the road information includes the point information including the intersection information on intersections, the junction information on road junctions, and the railroad crossing information on railroad crossings. The peripheral information acquisition module 13 can determine whether there is the stop point on the travel path (projected path) along which the vehicle is to travel, based on the road information and the current position information of the vehicle detected by the GPS receiver 91.

The stop point herein refers to a stop point existing in the middle of the travel path from a position at which it is determined that the driver is in the abnormal state to a position at which the vehicle is to be stopped. Therefore, the information 2 may not include information on a stop point located farther than the point at which the vehicle is to be stopped.

The information 3 is information as to whether there is a preceding vehicle or an obstacle ahead of the vehicle. The peripheral information acquisition module 13 may use, as the information 3, the pieces of the object information output from the radar sensor 28a and the camera sensor 28b. In one or more embodiments, the peripheral information acquisition module 13 acquires the information 3 on a preceding vehicle or an obstacle from the pieces of the object information from the radar sensor 28a and the camera sensor 28b. As the peripheral information acquisition module 13 acquires the peripheral information (including information 1, the information 2 and the information 3), the peripheral information acquisition module 13 outputs the peripheral information to the specific scene detection module 14.

The specific scene detection module 14 determines, based on the peripheral information, whether the current scene of the vehicle corresponds to one or more of the following scenes (a) to (e):

(a) the vehicle deviates from the lane, (b) the white lines defining the lane cannot be recognized, (c) there is the stop point on the travel path along which the vehicle is to travel (that is, the stop point has been detected ahead of the vehicle), (d) a preceding vehicle has been detected ahead of the vehicle, and (e) an obstacle has been detected ahead of the vehicle.

When the current scene of the vehicle corresponds to one or more of the scenes (a) to (e), the specific scene detection module 14 determines that the current scene of the vehicle is the specific scene.

When the specific scene detection module 14 determines that the current scene of the vehicle is the specific scene, the specific scene detection module 14 outputs to the deceleration control early-start determination module 15 a signal indicating that the specific scene has been detected, and a signal indicating the detailed content of the specific scene (e.g., signal indicating that the current scene corresponds to which scene of the scenes (a) to (e)). On the other hand, when the specific scene detection module 14 determines that the current scene of the vehicle is not the specific scene, the specific scene detection module 14 outputs to the deceleration control early-start determination module 15 a signal indicating that the specific scene has not been detected.

When the deceleration control early-start determination module 15 receives from the specific scene detection module 14 the signal indicating that the specific scene has not been detected, the deceleration control early-start determination module 15 sets a mode of the deceleration control to a normal operation mode. On the other hand, when the deceleration control early-start determination module 15 receives from the specific scene detection module 14 the signal indicating that the specific scene has been detected, the early-deceleration control start determination module 15 sets the mode of the deceleration control to an early operation mode.

The deceleration control early-start determination module 15 outputs a signal indicating the set mode of the deceleration control to the braking force request module 16.

Figure 2:
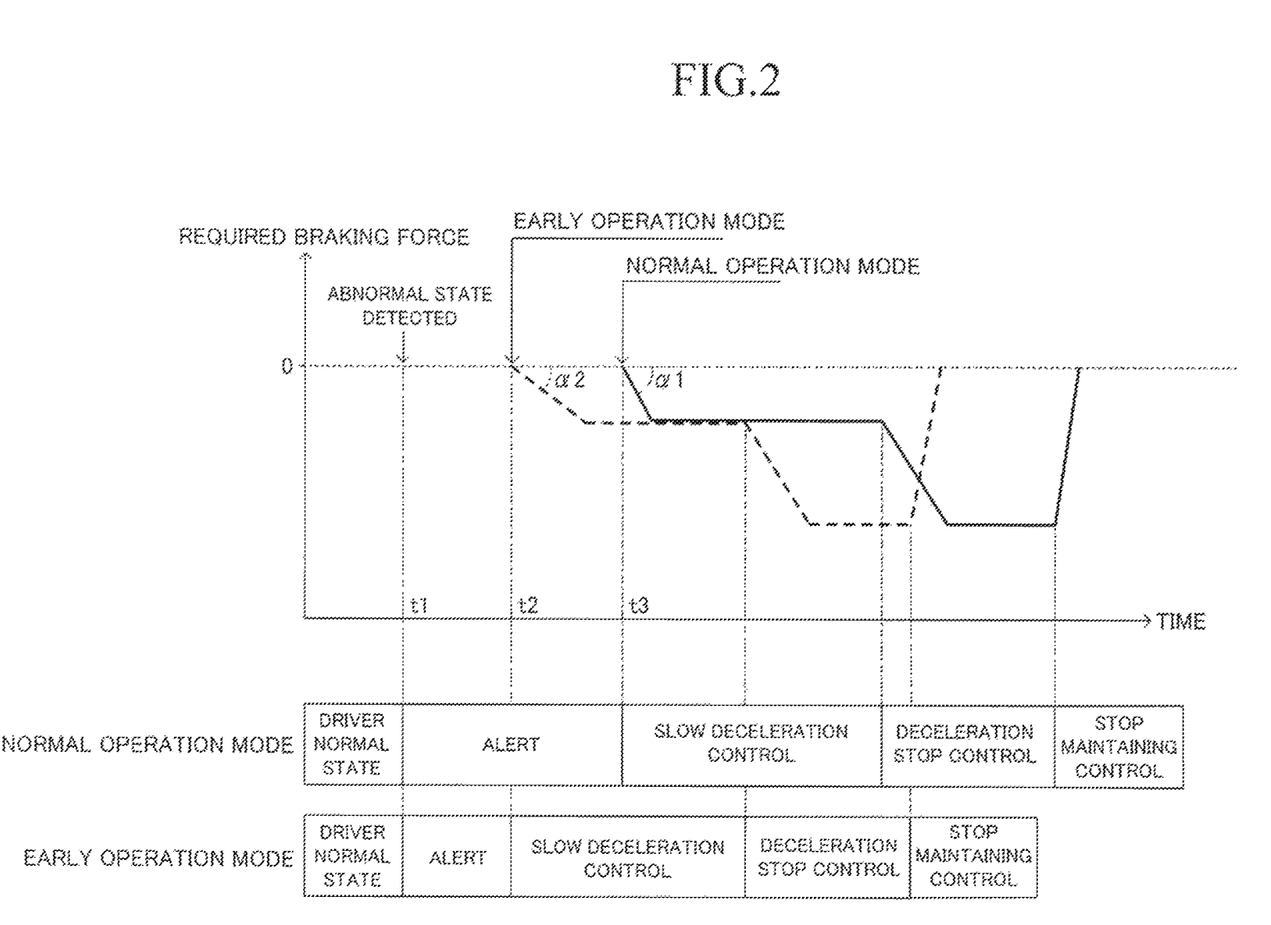
FIG. 2 is a graph including a transition example of a required braking force in deceleration control in a normal operation mode, and a transition example of the required braking force in the deceleration control in an early operation mode.

The braking force request module 16 outputs to the brake ECU 40 a braking force command (command indicative of the required braking force) in accordance with the set mode of the deceleration control. FIG. 2 is a graph for illustrating a transition example of the required braking force in the deceleration control in the normal operation mode, and a transition example of the required braking force in the deceleration control in the early operation mode. In FIG. 2, a bold solid line indicates the normal operation mode, and a bold dotted line indicates the early operation mode.

In the normal operation mode, the deceleration control is started at a time point t3 at which a first set time T1 has elapsed from a time point t1 at which the abnormal state of the driver has been detected (that is, time point at which the alert processing is started). Meanwhile, in the early operation mode, the deceleration control is started at a time point t2 before the first set time T1 has elapsed from the time point t1. The timing at which the deceleration control is started in the early operation mode is not limited to this example. The timing at which the deceleration control is started in the early operation mode may be set to an arbitrary timing after a lapse of a second set time T2 (<T1) from the time point t1 and before the first set time T1 has elapsed from the time point t1.

In both the normal operation mode and the early operation mode, the deceleration control includes slow deceleration control, deceleration stop control, and stop maintaining control. The deceleration control is performed in the following order: the slow deceleration control, the deceleration stop control, and the stop maintaining control. In the slow deceleration control, the required braking force is set so as to decelerate the vehicle slowly. In the deceleration stop control, the required braking force is set to a value larger than that of the slow deceleration control in order to stop the vehicle. As the vehicle is stopped, the stop maintaining control is performed, and then, the required braking force is returned to zero. In the stop maintaining control, the stopped state of the vehicle is maintained by operating the parking brake actuator 42. It should be noted that, when discussing the magnitude of the braking force in the present specification, this refers to the absolute value thereof.

As illustrated in FIG. 2, as the slow deceleration control is started, the required braking force is increased from zero at a predetermined gradient. Regarding the increase gradient of the required braking force, an increase gradient $\alpha 2$ in the early operation mode is smaller than an increase gradient $\alpha 1$ in the normal operation mode.

Further, the braking force request module 16 transmits a braking force command to the brake ECU 40, and a lighting command for the stop lamp 82 to the meter ECU 80.

In one or more embodiment, the braking force request module 16 receives the detailed content of the specific scene from the deceleration control early-start determination module 15. In one or more embodiment, the braking force request module 16 may change the required braking force in response to the detailed content of the specific scene. For example, the braking force request module 16 may set the required braking force to be larger as the necessity of stopping the vehicle earlier increases in view of the detailed content of the specific scene. Meanwhile, the braking force request module 16 may set the required braking force to be smaller as the necessity of stopping the vehicle earlier decreases in view of the detailed content of the specific scene.

<Control Routine>

Figure 3:
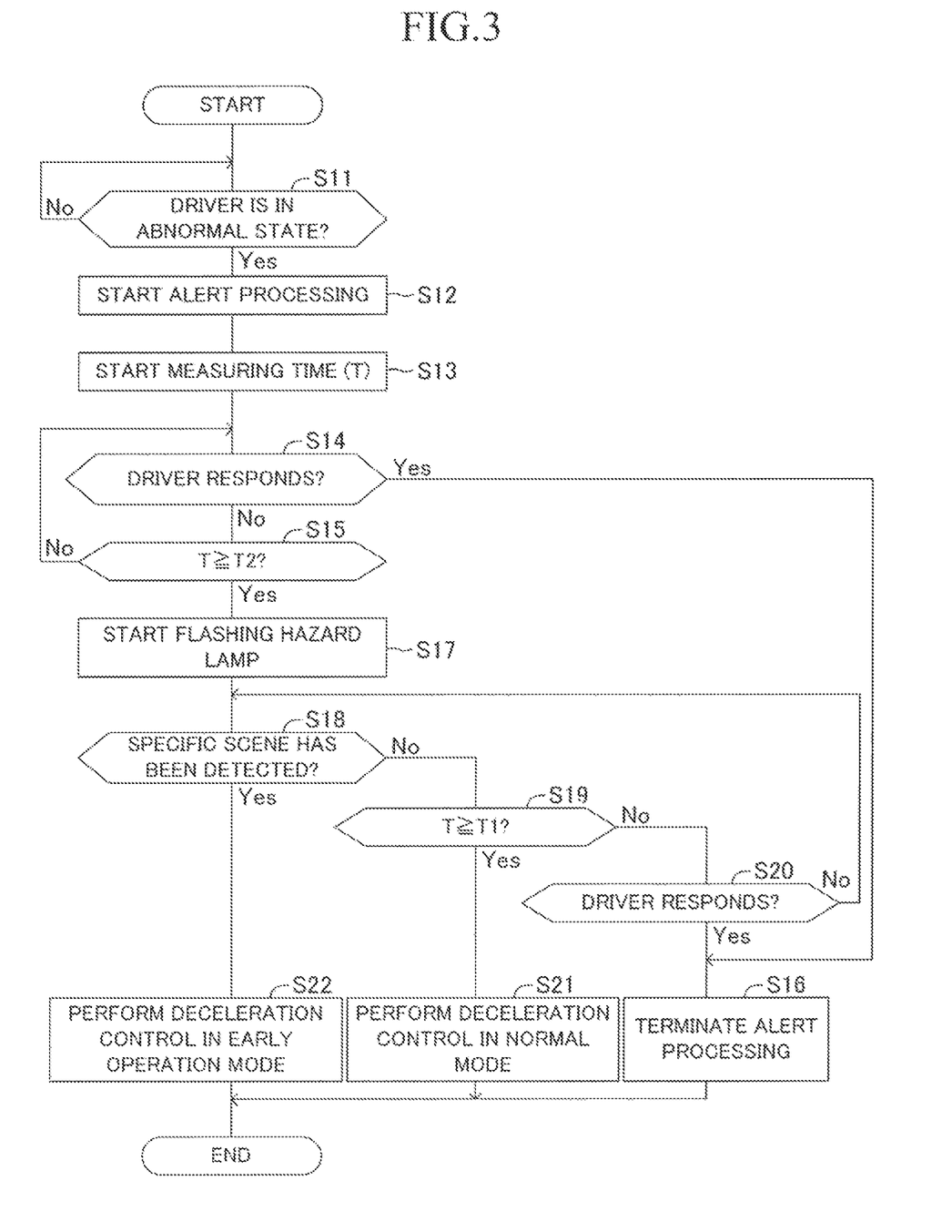
FIG. 3 is a flowchart illustrating a travel control routine.

Next, the flow of control processing performed in the driver abnormal state support system will be described. FIG. 3 is a travel control routine to be executed by the ECU 10.

As the ECU 10 starts the travel control routine, the ECU 10 determines whether or not the driver is in the abnormal state in Step S11. In this case, as described above, the ECU 10 determines whether or not the driver is in the non-driving operation state. The ECU 10 repeatedly executes this processing of Step S11. When the ECU 10 determines that the driver is in the abnormal state, the ECU 10 proceeds to Step S12 to start the alert processing for the non-driving operation state. Specifically, the ECU 10 outputs the alert command for the non-driving operation state to the alert ECU 70. Thus, the alert ECU 70 causes the buzzer 71 to utter the alert sound. Further, the alert ECU 70 flashes the warning lamp on the display unit 72, and displays the alert message prompting the driving operation on the display unit 72. For example, the alert message includes a message prompting the driver to operate at least one of the accelerator pedal, the brake pedal, and the steering wheel.

Next, in Step S13, the ECU 10 sets (resets) a timer to zero, and starts measuring a time by using the timer. Thus, the ECU 10 starts measuring an elapsed time since the alerting processing is started. Hereinafter, the "elapsed time since the alerting processing is started" is simply referred to "elapsed time T".

Next, in Step S14, the ECU 10 determines whether or not the driver responds in response to the alerting processing. Since the ECU 10 repeats the abnormal state determination for the driver, the ECU 10 reads that determination result in Step S14. When the state of the driver is the non-driving operation state (that is, the non-driving operation state continues even though the alerting processing is started), the ECU 10 makes a "No" determination in Step S14.

As described above, when there is no response by the driver, the ECU 10 proceeds to Step S15 to determine whether or not the elapsed time T has reached a predetermined second set time T2. When the elapsed time T has not yet reached the second set time T2, the ECU 10 returns to Step S14 to repeat the above-mentioned processing. The second set time T2 is longer than zero and shorter than the first set time T1.

When the ECU 10 has detected the driving operation of the driver (S14: Yes) while the ECU 10 repeatedly executes the processing of Steps S14 and S15, the ECU 10 proceeds to Step S16. In Step S16, the ECU 10 outputs to the alert ECU 70 a termination command for terminating the alert processing, and then, finishes this travel control routine. When a predetermined timing is reached, the ECU 10 again starts the travel control routine.

On the other hand, when the elapsed time T has reached the second set time T2 without detecting the response of the driver, the ECU 10 proceeds to Step S17 to output a flashing command for the hazard lamp 81 to the meter ECU 80. Thus, the flashing of the hazard lamp 81 (warning processing) is started. In this manner, the ECU 10 performs the warning processing for a driver of a following other vehicle behind the own vehicle.

Next, in Step S18, the ECU 10 determines whether or not the specific scene has been detected, that is, the current scene of the vehicle corresponds to one or more of the above-mentioned scenes (a) to (e). When the specific scene has not been detected (S18: No), the ECU 10 proceeds to Step S19 to determine whether or not the elapsed time T has reached the predetermined first set time T1.

When the elapsed time T has not yet reached the first set time T1 (S19: No), the ECU 10 proceeds to Step S20 to determine whether or not the driver responds in response to the alerting processing. When the non-driving operation state still continues, the ECU 10 makes a "No" determination. In this case, the ECU 10 returns to Step S18. Thus, the ECU 10 repeatedly executes the processing of Steps S18 to S20.

When the driving operation of the driver has been detected (S20: Yes) while the ECU 10 repeatedly execute the above-mentioned processing, the ECU 10 proceeds to Step S16. In this case, the ECU 10 outputs to the alert ECU 70 the termination command for terminating the alert processing. Further, the ECU 10 outputs a command for terminating the flashing of the hazard lamp 81 to the meter ECU 80. Next, the ECU 10 finishes this travel control routine. When the predetermined timing is reached, the ECU 10 again starts the travel control routine.

When the elapsed time T has reached the first set time T1 without detecting the driving operation of the driver, there is a high possibility that the driver is in the abnormal state in which the driver loses the ability to drive the vehicle. When the specific scene has not been detected and the elapsed time T has reached the first set time T1 without detecting the driving operation of the driver (S19: Yes), the ECU 10 finally decides that the driver is in the abnormal state. Next, the ECU 10 proceeds to Step S21 to perform the deceleration control in the normal operation mode.

In Step S21, the ECU 10 outputs the braking force command to the brake ECU 40 in accordance with the deceleration control in the normal operation mode, and outputs the lighting command for the stop lamp 82 to the meter ECU 80.

Meanwhile, when the specific scene has been detected before the elapsed time T has reached the first set time T1, it is necessary to start the deceleration control earlier. Thus, when the driving operation of the driver has not been detected and the specific scene has been detected before the elapsed time T has reached the first set time T1 (S18: Yes), the ECU 10 proceeds to Step S22 to perform the deceleration control in the early operation mode.

In Step S22, the ECU 10 outputs the braking force command to the brake ECU 40 in accordance with the deceleration control in the early operation mode, and outputs the lighting command for the stop lamp 82 to the meter ECU 80. In this case, as illustrated in FIG. 2, the increase gradient α2 in the required braking force at the start of the deceleration control becomes smaller than the increase gradient α1 in the normal operation mode.

In the early operation mode, the period from the start of the flashing of the hazard lamp 81 to the start of the deceleration control is shorter than that in the normal operation mode. For this reason, a driver of a following other vehicle cannot afford to perform an avoidance operation for preventing the following other vehicle from colliding with the own vehicle, and therefore, there is a possibility that the following other vehicle may suddenly approach the own vehicle. In view of this, in the early operation mode, the ECU 10 decelerates the own vehicle such that the increase gradient of the required braking force at the start of the deceleration control is smaller than that in the normal operation mode. Therefore, the own vehicle is decelerated more slowly compared to in the normal operation mode. As a result, the driver of the following other vehicle can afford to perform the avoidance operation. Accordingly, it is possible to prevent the following other vehicle from suddenly approaching the own vehicle.

As the ECU 10 starts the deceleration control in the normal operation mode or the early operation mode, the ECU 10 outputs a transmission command of the help signal to the external communication ECU 100. Therefore, the vehicle is decelerated while transmitting the help signal to the help network center. After the vehicle is stopped, the ECU 10 outputs a parking braking command to the brake ECU 40. The brake ECU 40 causes the parking brake actuator 42 to operate/drive in response to the parking braking command, to thereby maintain the stopped state of the vehicle.

After the ECU 10 outputs the parking braking command, the ECU 10 terminates the deceleration control in the normal operation mode or the early operation mode. In this case, the ECU 10 continues flashing the hazard lamp 82.

Although not shown in the flowchart of FIG. 3, the ECU 10 determines whether or not the driving operation of the driver has been detected even during the deceleration control in the normal operation mode or the early operation mode. That is, the ECU 10 repeats the abnormal state determination for the driver even during the deceleration control. When the driving operation of the driver has been detected during the deceleration control, the ECU 10 terminates the deceleration control at that time point. In one or more embodiment, when the driving operation of the driver has been detected during the deceleration control in the normal operation mode or the early operation mode, the ECU 10 may prohibit an accelerator override (that is, disable an acceleration request based on the accelerator pedal operation). Thus, the ECU 10 may continue performing the deceleration control to thereby stop the own vehicle.

As described above, the control apparatus is configured to, when the abnormal state of the driver has been detected and the current scene of the vehicle is the specific scene, start the deceleration control in the early operation mode even before the first set time T1 has elapsed since the start of the alerting processing to thereby stop the vehicle. Therefore, the vehicle can be stopped more safely.

The deceleration control in the early operation mode is started at least after the second set time T2 has elapsed since the start of the alert processing. The alerting processing is executed until the second set time T2 has elapsed, and therefore, it is possible to confirm whether the driver is in the abnormal state. When the abnormal state of the driver is resolved before the second set time T2 has elapsed since the start of the alerting processing, unnecessary deceleration control can be prevented from being started.

In the early operation mode, the increase gradient of the required braking force at the start of the deceleration control is set to be smaller than that in the normal operation mode. Although the period from the start of the flashing of the hazard lamp 81 to the start of the deceleration control is short, the driver of the following other vehicle can afford to perform the avoidance operation. Therefore, it is possible to prevent the following other vehicle from suddenly approaching the own vehicle.

It is assumed that, in the situation in which the control apparatus has detected the abnormal state of the driver, the control apparatus has detected the following scene 1 or 2:
  Scene 1: the vehicle deviates from the lane; and
  Scene 2: the control apparatus cannot recognize the white lines defining the lane on which the vehicle travels.

In this case, the control apparatus determines that the current scene of the vehicle is the specific scene. Therefore, it is possible to stop the vehicle safely at an early timing through the deceleration control in the early operation mode.

It is assumed that, in the situation in which the control apparatus has detected the abnormal state of the driver, the control apparatus has detected the stop point (an intersection, a junction, or a railroad crossing) on the travel path along which the vehicle is to travel. Also in this case, the control apparatus determines that the current scene of the vehicle is the specific scene. Therefore, it is possible to stop the vehicle safely at an early timing through the deceleration control in the early operation mode.

It is assumed that, in the situation in which the control apparatus has detected the abnormal state of the driver, the control apparatus has detected a preceding vehicle or an obstacle ahead of the vehicle. In this case, the control apparatus determines that the current scene of the vehicle is the specific scene. Therefore, it is possible to stop the vehicle safely at an early timing through the deceleration control in the early operation mode.

The vehicle travel control apparatus according to one or more embodiments is not limited to the above-described example, and various modifications can be made without departing from the scope of the present disclosure.

In the above-described embodiment, the control apparatus determines that the current scene of the vehicle is the specific scene when the control apparatus has detected one or more of the following scenes (a) to (e): (a) the vehicle deviates from the lane, (b) the white lines defining the lane cannot be recognized, (c) there is the stop point on the travel path along which the vehicle is to travel, (d) there is a preceding vehicle ahead of the own vehicle, and (e) there is an obstacle ahead of the own vehicle. However, the configuration of the control apparatus is not limited to this example. In one or more embodiments, the control apparatus may select one or more of the scenes (a) to (e), and determine that the current scene of the vehicle is the specific scene when the control apparatus has detected one or more of the selected scenes. In one or more embodiments, the control apparatus may set one or more scenes other than the scenes (a) to (e) as the specific scene for stopping the vehicle earlier.

In the above-described embodiment, although the control apparatus starts the flashing of the hazard lamp 81 after the elapsed time T since the start of the alerting processing has reached the second set time T2, the configuration of the control apparatus is not limited to this example. In one or more embodiments, the control apparatus may start the flashing of the hazard lamp 81 at the same time as the start of the alerting processing. In one or more embodiments, the control apparatus may start the flashing of the hazard lamp 81 at any timing before the deceleration control is started.

In the above-described embodiment, the control apparatus determines the abnormal state of the driver based on the period of duration of the non-driving operation state. In one or more embodiments, the control apparatus may use a so-called "driver monitoring technology" disclosed in Japanese Patent Application Laid-Open No. 2013-152700 to determine the abnormal state of the driver. More specifically, a camera for photographing the driver may be arranged on a member (for example, the steering wheel or a pillar) in a vehicle interior. The ECU 10 monitors a gaze direction or face direction of the driver by using an image captured by the camera. The driving support ECU 10 determines that the driver is in the abnormal state when the gaze direction or face direction has been continuously directed for a predetermined period of time or longer in a direction other than a direction (e.g., front direction) when the driver drives the vehicle in the normal state.

In one or more embodiments, the control apparatus may perform the abnormal state determination for the driver through use of the confirmation button 30. For example, when the ECU 10 has detected the non-driving operation state, the ECU 10 requests the driver to operate the confirmation button 30 through a display or sound. When a state in which the driver does not operate the confirmation button 30 has continued for a predetermined abnormal determination time or longer, the ECU 10 may determine that the driver is in the abnormal state.

In the above-described embodiment, the ECU 10 performs the driver abnormal state support system in a situation in which the ACC system is being performed. In one or more embodiments, the ECU 10 may perform the driver abnormal state support system in a situation in which the ACC system is not being performed.

According to the above-described embodiment, in the early operation mode, the increase gradient of the required braking force at the start of the slow deceleration control is set to be smaller than that in the normal operation mode ($\alpha 2 < \alpha 1$). The increase gradient need not be set as such. In one or more embodiments, the increase gradients of the required braking force in the normal operation mode and the early operation mode may be set to the same value ($\alpha 2 = \alpha 1$).

What is claimed is:

1. A vehicle travel control apparatus for a vehicle, comprising:
  an abnormal state determination module configured to repeatedly determine whether or not a driver of the vehicle is in an abnormal state in which the driver loses an ability to drive the vehicle;
  a driver alert module configured to, when determining that the driver is in the abnormal state, start alert processing for the driver;

a first travel stop module configured to, when determining that the abnormal state is not resolved at a time point at which a first set time has elapsed since the start of the alert processing, start deceleration control to stop the vehicle;
a specific scene determination module configured to acquire peripheral information of the vehicle in a situation in which the abnormal state is not resolved, and determine whether or not a travel scene of the vehicle is a predetermined specific scene based on the peripheral information; and
a second travel stop module configured to, when determining that the travel scene of the vehicle is the specific scene, start the deceleration control before the first set time has elapsed since the start of the alert processing to stop the vehicle, wherein the second travel stop module is configured to, when determining that the travel scene of the vehicle is the specific scene after a second set time has elapsed since the start of the alert processing, start the deceleration control to stop the vehicle, the second set time being longer than zero and shorter than the first set time.

2. The vehicle travel control apparatus according to claim 1, further comprising a peripheral warning module configured to, when determining that the driver is in the abnormal state, start warning processing for a peripheral object of the vehicle before the deceleration control is started,
wherein the second travel stop module is configured to, at the start of the deceleration control, increase a braking force more slowly than the first travel stop module.

3. The vehicle travel control apparatus according to claim 1, wherein the specific scene includes a scene in which white lines defining a lane in which the vehicle travels cannot be recognized, or a scene in which the vehicle deviates from the lane.

4. The vehicle travel control apparatus according to claim 3, further comprising a lane departure prevention control system for preventing the vehicle from deviating from the lane, and
the specific scene determination module is further configured to
acquire lane deviation information or white line recognition information from the lane departure prevention control system, the lane deviation information being information on whether the vehicle deviates from the lane, and the white line recognition information being information on whether the white lines can be recognized, and
determine whether or not the travel scene of the vehicle is the specific scene.

5. The vehicle travel control apparatus according to claim 1, wherein the specific scene includes a scene in which a stop point has been detected, the stop point being a point on a travel path along which the vehicle is to travel, and at which the vehicle should be stopped.

6. The vehicle travel control apparatus according to claim 5, wherein the stop point includes at least one of:
an intersection on the travel path along which the vehicle is to travel,
a junction with another lane on the travel path along which the vehicle is to travel, or
a railroad crossing on the travel path along which the vehicle is to travel.

7. The vehicle travel control apparatus according to claim 5, further comprising a road sign assist system for recognizing a road sign installed in front of the vehicle, and assisting a driving operation of the driver by using information on the recognized road sign, and
the specific scene determination module is further configured to
acquire information on the road sign from the road sign assist system, and
determine whether or not the travel scene of the vehicle is the specific scene.

8. The vehicle travel control apparatus according to claim 5, further comprising a navigation system, and
the specific scene determination module is further configured to
acquire information on the stop point from the navigation system, and
determine whether or not the travel scene of the vehicle is the specific scene.

9. The vehicle travel control apparatus according to claim 1, wherein the specific scene includes a scene in which a preceding vehicle has been detected ahead of the vehicle, or a scene in which an obstacle has been detected ahead of the vehicle.

10. A vehicle travel control apparatus for a vehicle, comprising:
at least one processor programmed to:
repeatedly determine whether or not a driver of the vehicle is in an abnormal state in which the driver loses an ability to drive the vehicle;
when determining that the driver is in the abnormal state, start alert processing for the driver;
acquire peripheral information of the vehicle in a situation in which the abnormal state is not resolved; and
determine whether or not a travel scene of the vehicle is a predetermined specific scene based on the peripheral information,
wherein
upon a determination that the travel scene of the vehicle is not the specific scene and that the abnormal state is not resolved at a time point at which a first set time has elapsed since the start of alert processing, start deceleration control,
upon a determination that the travel scene of the vehicle is not the specific scene and that the abnormal state is resolved at the time point at which the first set time has elapsed, terminate alert processing, and
upon a determination that the travel scene of the vehicle is the specific scene and that the abnormal state is not resolved at a time point at which a second set time has elapsed since the start of the alert processing, start deceleration control, wherein the second set time is earlier than the first set time.

* * * * *